US009917527B2

(12) United States Patent
Boe

(10) Patent No.: US 9,917,527 B2
(45) Date of Patent: Mar. 13, 2018

(54) ARRANGEMENT PROVIDING A 3-PHASE OR 1-PHASE POWER STREAM

(71) Applicant: Siemens Aktiengesellschaft, München (DE)

(72) Inventor: Ove Boe, Tanem (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 42 days.

(21) Appl. No.: 14/785,395

(22) PCT Filed: Apr. 25, 2014

(86) PCT No.: PCT/EP2014/058454
§ 371 (c)(1),
(2) Date: Oct. 19, 2015

(87) PCT Pub. No.: WO2014/177466
PCT Pub. Date: Nov. 6, 2014

(65) Prior Publication Data
US 2016/0099574 A1    Apr. 7, 2016

(30) Foreign Application Priority Data

Apr. 29, 2013    (EP) .................................... 13165770

(51) Int. Cl.
*H02M 5/14*    (2006.01)
*H02M 5/00*    (2006.01)
(Continued)

(52) U.S. Cl.
CPC ................ *H02M 5/14* (2013.01); *H02J 3/46* (2013.01); *H02M 5/00* (2013.01); *F16L 53/007* (2013.01); *H02M 2001/008* (2013.01)

(58) Field of Classification Search
CPC ...... H02J 3/46; H02M 5/00; H02M 2001/008; H02M 5/14; F16L 53/007
(Continued)

(56) References Cited

U.S. PATENT DOCUMENTS 6,617,556 B1 * 9/2003 Wedel ..................... E21B 43/01
137/341
7,992,632 B2 * 8/2011 Bornes ..................... E21B 43/01
166/272.1
(Continued)

FOREIGN PATENT DOCUMENTS

EP    1422817 A2    5/2004
EP    2538539 A1    12/2012
(Continued)

OTHER PUBLICATIONS

International Search Report PCT/ISA/210 for International Application No. PCT/EP2014/058454 dated Jul. 24, 2014.
(Continued)

*Primary Examiner* — Kyle J Moody
(74) *Attorney, Agent, or Firm* — Harness, Dickey & Pierce, P.L.C.

(57) ABSTRACT

An arrangement is provided for alternatively providing a 3-phase or a 1-phase power stream. In an embodiment, the arrangement includes a 3-phase power source including a first, a second and a third power source output terminal; a switching section adapted to selectively provide, from the three power source output terminals of the 3-phase power source, either: a 3-phase power stream at three arrangement output terminals or a 1-phase power stream at two arrangement output terminals, different from the three arrangement output terminals.

20 Claims, 3 Drawing Sheets

(51) Int. Cl.
*H02J 3/46* (2006.01)
*F16L 53/00* (2018.01)
*H02M 1/00* (2006.01)

(58) Field of Classification Search
USPC .................................... 363/142, 56, 72, 36
See application file for complete search history.

(56) References Cited

U.S. PATENT DOCUMENTS

| | | | |
|---|---|---|---|
| 8,982,593 B2* | 3/2015 | Nondahl | H02M 1/12 |
| | | | 363/36 |
| 2008/0236810 A1 | 10/2008 | Bornes et al. | |
| 2012/0125906 A1 | 5/2012 | Geertsen et al. | |
| 2015/0122362 A1* | 5/2015 | Haugan | H02M 5/4505 |
| | | | 138/33 |
| 2015/0123612 A1* | 5/2015 | Ide | B60L 11/1812 |
| | | | 320/109 |

FOREIGN PATENT DOCUMENTS

| | | |
|---|---|---|
| EP | 2557675 A1 | 2/2013 |
| WO | WO-2006075913 A1 | 7/2006 |

OTHER PUBLICATIONS

International Preliminary Report on Patentability for International Application No. PCT/EP2014/058454 dated Jan. 20, 2015.
Written Opinion of the International Searching Authority PCT/ISA/237 for International Application No. PCT/EP2014/058454 dated Jul. 24, 2014.

* cited by examiner

US 9,917,527 B2

ARRANGEMENT PROVIDING A 3-PHASE OR 1-PHASE POWER STREAM

PRIORITY STATEMENT

This application is the national phase under 35 U.S.C. §371 of PCT International Application No. PCT/EP2014/058454 which has an International filing date of Apr. 25, 2014, which designated the United States of America and which claims priority to European patent application number EP 13165770 filed Apr. 29, 2013, the entire contents of which are hereby incorporated herein by reference.

FIELD

At least one embodiment of the present invention generally relates to an arrangement and/or a method for alternatively providing a 3-phase or a 1-phase power stream.

BACKGROUND

In a subsea installation or subsea application, such as an oil or gas exploration and conveying application, there may be a need for heating pipelines which convey the gas or the oil to prevent clogging due to the generation of hydrates within the conveyed carbohydrates including oil and/or gas. This clogging or aggregation of hydrates within the pipeline may occur both during operation, i.e. flow of the carbohydrates, and in particular at a steady state or at still-stand.

Conventionally, to prevent the hydrates from being clogged chemicals have been injected into the manifold or the pipeline. Alternatively, a direct electrical heating (DEH) system has been installed, wherein the electric power has been provided from a topside facility, i.e. a facility which is located above the sea level. The direct electrical heating may heat a pipeline by running an electric current through the pipeline which evolves, when ends of the pipeline are connected to two terminals of a 1-phase power source.

Document WO 2006/075913 A1 discloses a system for power supply to subsea installations, wherein a power supply cables are for direct electrical heating of a pipeline and the system is further configured, to provide a 3-phase power supply to an electrically powered motor in a subsea installation unit, wherein means are arranged for switching so that the three conductors forming the power supply cables form parallel conductors in a second circuit configuration, wherein the power supply cables supply power for direct heating of the pipeline.

It has been observed that supply of the 1-phase power stream from a topside facility to the direct electrical heating system is very cumbersome and difficult and involves hampering the performance of the system.

SUMMARY

The inventors have recognized that there may be a need for an arrangement and for a method for allowing supply of electric energy to a direct electrical heating system, in particular located at a bottom of the sea or at a ground of the sea, which is simpler in construction compared to conventional systems and which reduces installation and maintenance efforts.

The need may be met by the subject-matter of the independent claims. The dependent claims specify particular embodiments of the invention.

According to an embodiment of the present invention, an arrangement is provided for alternatively providing a 3-phase or a 1-phase power stream, comprising a 3-phase power source having a first, a second and a third power source output terminal; a switching section adapted to selectively provide from the three power source output terminals of the 3-phase power source: a 3-phase power stream at three arrangement output terminals or a 1-phase power stream at two arrangement output terminals, different from the three arrangement output terminals, wherein power of the three input phases is evenly distributed to provide the 1-phase power stream.

According to an embodiment of the present invention, a method is provided, for use of the arrangement according to one of the preceding embodiments in a subsea application, in particular in a depth 1000 m to 4000 m below sea level, for alternatively driving a 3-phase load, in particular a variable speed drive, such as a motor, a pump, or a 1-phase load, in particular a direct electrical heating system for heating a pipe.

According to an embodiment of the present invention, a method is provided of alternatively providing a 3-phase or 1-phase power stream, comprising receiving at a first, a second and a third power source output terminal electrical power form a 3-phase power source; selectively providing from the three power source output terminals of the 3-phase power source: a 3-phase power stream at three arrangement output terminals or a 1-phase power stream at two arrangement output terminals, different from the three arrangement output terminals. Further, the power of the three input phases is evenly distributed to provide the 1-phase power stream.

Embodiments of the present invention are now described with reference to the accompanying drawings. In the drawings, elements similar in structure and/or function are labelled with the same reference signs differing only in the first digit.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF THE EXAMPLE EMBODIMENTS

Figure 1:
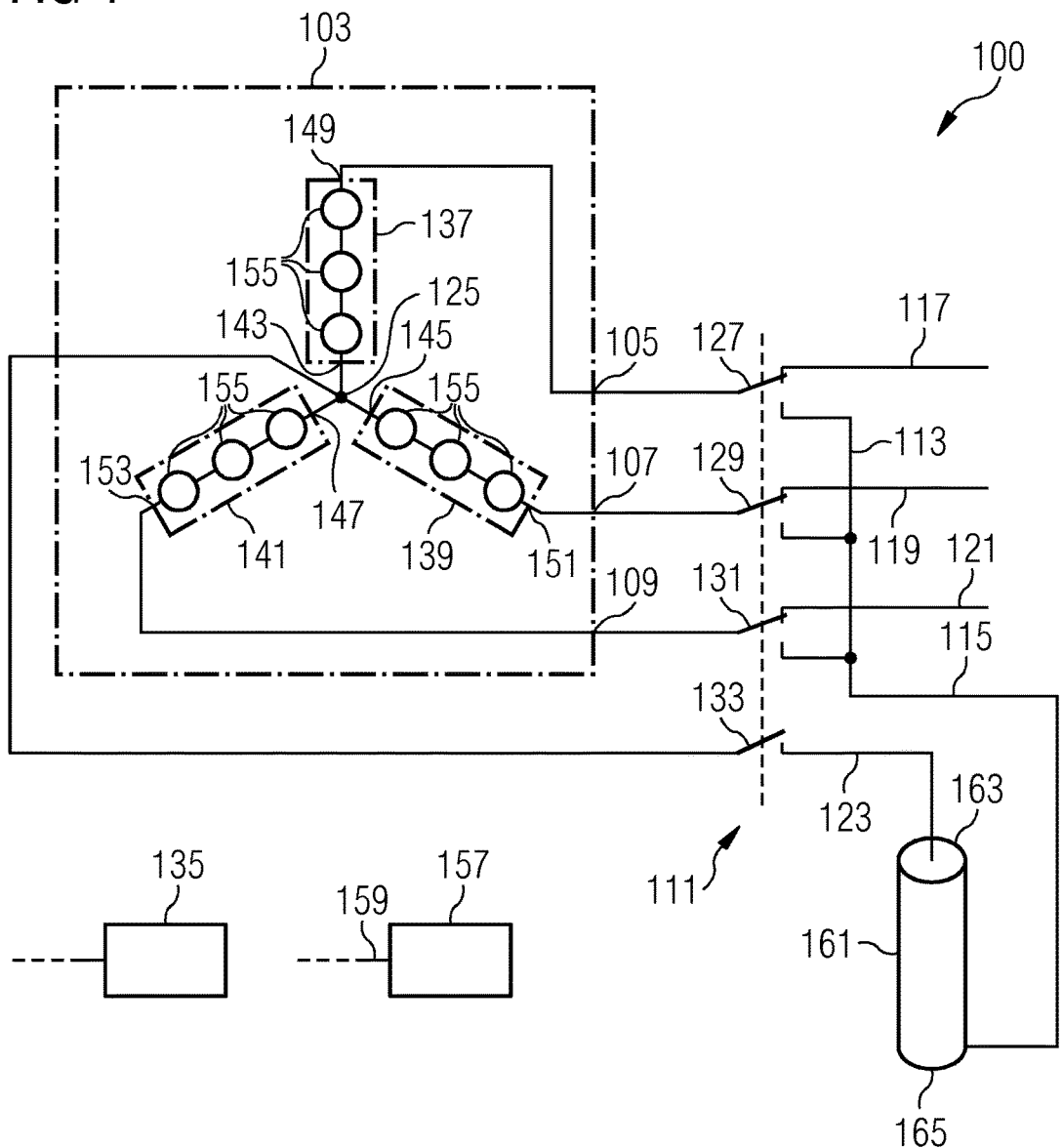
FIG. 1 schematically illustrates an arrangement for alternatively providing a 3-phase or a 1-phase power stream according to an embodiment of the present invention.

According to an embodiment of the present invention, an arrangement is provided for alternatively providing a 3-phase or a 1-phase power stream, comprising a 3-phase power source having a first, a second and a third power source output terminal; a switching section adapted to selectively provide from the three power source output terminals of the 3-phase power source: a 3-phase power stream at three arrangement output terminals or a 1-phase power stream at two arrangement output terminals, different from the three arrangement output terminals, wherein power of the three input phases is evenly distributed to provide the 1-phase power stream.

The arrangement may comprise the arrangement output terminals (for connection to a respective node, i.e. a 3-phase load or a 1-phase load) which may provide the 3-phase power stream and the 1-phase power stream. Thereby, the 3-phase power stream may be provided at three different arrangement output terminals and the 1-phase power stream may be provided at two different arrangement output terminals. The arrangement output terminals may allow connection of a load thereto.

The 3-phase power source may provide a particular output voltage (which may be defined between pairs of the three phases) and the 3-phase power source may be provided with electric energy by another power source, such as another 3-phase power source. Thereby, the other power source, in particular the other 3-phase power source, may provide a lower output voltage than the 3-phase power source. In order to increase the output voltage, the 3-phase power source may comprise a plurality of power source sections which may be at least partially connected in series in order to increase the output voltage compared with the output voltage provided by the other 3-phase power source. The 3-phase power stream may be provided at the first, the second and the third power source output terminals. The first, the second and the third power source output terminal may allow connection of a 3-phase load thereto.

The switching section may be used to switch between provision of a 3-phase power stream and a 1-phase power stream depending on the load intended to be supplied with electric energy, in particular depending on whether the load intended to be supplied with electric energy is a 3-phase load or a 1-phase load. Thereby, in particular, a pump or a motor may be a 3-phase load and a direct electrical heating (DEH) system may be a 1-phase load. Thereby, the arrangement supports that these different kinds of loads are supplied with electric energy. Thereby, a large flexibility is provided. In particular, in a typical subsea exploration or subsea application, conventionally a 3-phase power stream may be available but a 1-phase power stream may not be available. By using the available 3-phase power stream to power the 3-phase power source of the arrangement and by switching or by actuating the switching section to switch to the provision of a 1-phase power stream, also a 1-phase load may be supplied with electric energy originally using the 3-phase power stream.

Therefore, it may not be necessary anymore to use a particular cable from a topside facility located above the sea level, in order to supply a 1-phase load with electric energy. Thereby, equipment may be saved, installation costs may be reduced and the whole subsea acceleration system may be simplified.

The power of the three input phases is evenly distributed to provide the 1-phase power stream. In particular, the 3-phase power source may provide at each of the three phases a particular power output and the three different power outputs may be evenly supplied and distributed to the 1-phase power stream, such that a same amount of power is drawn from every of the three phases of the 3-phase power source.

According to an embodiment of the present invention the switching section is adapted to selectively connect at least two power source output terminals of the three power source output terminals with each other and allow a connection thereto; or disconnect the at least two power source output terminals of the three power source output terminals from each other, wherein the at least two power source output terminals connected with each other provide a phase of the 1-phase power stream.

The at least two power source output terminals of the three power source output terminals which are connected in a second operation mode of the arrangement may provide the same voltage levels or may be synchronized, in order to avoid unintended currents flowing from one of the output terminals to another one of the output terminals. In order to achieve the synchronization of the voltage at the output terminals which are connected to each other in the second operation mode, a particular control section may be provided which may control the 3-phase power source, in particular control transistors within the 3-phase power source.

In a first operation mode, all the three power source output terminals, i.e. the first, the second and the third power source output terminals, may be disconnected from each other, such as to provide a 3-phase power stream at the first, the second and the third power source output terminals.

The arrangement may address that in the future the need for various types of pumping installations in the subsea oil and gas fields may be evident. Thereby, at still-stand of the conveying of the oil and/or gas, normally no power for the pumping is required. In particular, there may be no need to supply a 3-phase power source with electric energy. In particular, at this situation, when the gas/oil is not conveyed within the pipeline, it may be necessary to avoid clogging of the gas/oil comprised within the pipeline. In this situation, the arrangement may advantageously be switched to provide a 1-phase power stream in order to supply a direct electrical heating system with power which is not needed for the pumps and/or motors. Thereby, the 3-phase power source may comprise a variable speed drive (VSD) which may be installed for operating a pump and the switching section (also referred to as change-over switch) may be used to switch to the provision of the 1-phase power stream. In particular, when in the second operational mode the 1-phase power stream may be used as a high voltage power supply for the direct electrical heating. Thereby, the 3-phase power source may adopt a "perfect harmony topology", or in particular a star-like topology comprised of a plurality of variable speed drives which may form three strands connected at a neutral node, wherein each strand may comprise a series-connected plurality of variable speed drives (also referred to as 3-phase to 1-phase converters). Further, a control system of the variable speed drives or the converters may be needed to be adapted to handle the first mode of operation (providing the 3-phase power stream) and the second mode of operation (providing the 1-phase power stream).

Thereby, a combined use of the infrastructure for two purposes is provided. Thereby, particular components of a topside installation may be redundant. Furthermore, it may be expected that many subsea installations may not have any topside facility. Therefore, the arrangement enables the use of a direct electrical heating system also for this kind of oil field which do not have available any topside facility, and which in particular do not have available any 1-phase power stream at the bottom of the sea. The combined use may greatly reduce the installation costs and may increase the flexibility. Also the power source may be connected to multiple pipelines, either in parallel or in sequence based on the specific requirements. The single phase power load from a DEH system may be evenly distributed of the three input phases by the converter. Also the voltage and frequency control of the converter may enable a flexible use to connect to various lengths of pipelines requiring different voltage/frequency for the operation of the DEH system.

According to an embodiment of the present invention, a phase of the 1-phase power stream is provided by the power source output terminal of the three power source output terminals which is not connected with the at least two power source output terminals connected with each other; or by a neutral node having a constant electrical potential and allowing a connection thereto.

Thereby, a large flexibility is provided to provide the other phase of the 1-phase power stream. The two alternatives may be selected based on the requirements of the 1-phase load, in particular the requirements regarding voltage, current and/or power.

According to an embodiment of the present invention, the three arrangement output terminals for the 3-phase power stream correspond to the three power source output terminals of the 3-phase power source and the two arrangement output terminals for the 1-phase power stream correspond to the two of three power source output terminals of the 3-phase power source. Thereby, a simple construction may be provided.

According to an embodiment of the present invention, the 3-phase power source comprises a first, a second and a third converter arrangement, being powered by another 3-phase power source and each having a first and a second converter arrangement output terminal, wherein the first converter arrangement output terminals of the three converter arrangements are connected to each other at the neutral node, wherein the second converter arrangement output terminal of the first converter arrangement forms the first power source output terminal, wherein the second converter arrangement output terminal of the second converter arrangement forms the second power source output terminal, wherein the second converter arrangement output terminal of the third converter arrangement forms the third power source output terminal.

Each converter arrangement may comprise one or more converters, in particular 3-phase to 1-phase converters. Thereby, the converters may be partially connected in series and/or partially connected in parallel. The 1-phase power output stream provided by each converter arrangement may be provided at the first and the second converter arrangement output terminals. When the first converter arrangement output terminals of the three converter arrangements are connected to each other at the neutral node, a star-like configuration may be achieved, which may be complying with the perfect harmony topology. Other arrangements are possible. An operation mode of a control section of the arrangement may be different in the first operation mode of the arrangement and the second operation mode of the arrangement.

According to an embodiment of the present invention, the other 3-phase power source comprises at least three secondary windings of a transformer. In particular, a plurality of other 3-phase power sources may be provided which supply the 3-phase power source with electric energy. In particular, the transformer may comprise one primary winding and nine secondary windings, wherein the secondary windings may provide the electric energy to the 3-phase power source. Thereby, conventional equipment may be utilized advantageously in order to power the 3-phase power source. Also, when the 3-phase power source comprises the first, the second and the third converter arrangement, conventionally available equipment may be utilized. Thereby, the installation cost and installation procedure may be simplified or reduced.

According to an embodiment of the present invention, at least one of the first, the second and the third converter arrangement comprises at least two, in particular 3 to 30, further in particular 6 to 8, 3-phase to 1-phase converters which are series connected at their 1-phase output terminals.

Series connection of a number of 3-phase to 1-phase converters may increase an achievable voltage at the power source output terminal, which may allow to power particular 1-phase or 3-phase loads which require a relatively high voltage, which may in particular require a higher voltage than provided by the other 3-phase power source. Furthermore, conventional modules may be utilized, thereby simplifying the construction and reducing the costs.

According to an embodiment of the present invention, at least one 3-phase to 1-phase converter comprises an input section with six diodes for rectifying a 3-phase power stream; a capacitor for smoothing the rectified power stream; and an output section comprising four power transistors for providing a 1-phase output stream.

The input section may alternatively or additionally comprise also a number of transistors. The six diodes may be arranged in three strands of pairs of diodes which are connected in series. A connection node between two diodes of each pair may be connected to a respective phase of the other 3-phase power source. Thereby, a simple rectifying process may be achievable. The capacitor may reduce ripples of a direct current power stream which is output by the input section of the 3-phase to 1-phase converter. The four transistors of the output section may be arranged in two strands, wherein each strand comprises a series connection of two transistors. Between the two transistors in each strand, a phase of the 1-phase power stream may be provided. Thereby, conventionally available equipment may be advantageously used for the construction of the arrangement according to this embodiment of the present invention.

According to an embodiment of the present invention, during switching between a 3-phase and 1-phase power stream transistors of the output section of the 3-phase to 1-phase converter are controlled to adopt a non-conducting state.

When the transistors of the output section, in particular all output sections of all 3-phase to 1-phase converters comprised in the 3-phase power source, adopt a non-conducting state, the 3-phase power source may not output any power stream. Thereby, the switching may be simplified and damages of components may be reduced or even avoided.

According to an embodiment of the present invention, the first, the second and the third power source output terminals of the 3-phase power source provide synchronized voltages and are connected with each other to provide a phase of the 1-phase power stream and the neutral node provides another phase of the 1-phase power stream. Thereby, a particular configuration, which is easily achievable is provided, in order to provide the 1-phase power stream in the second operation mode of the arrangement. This configuration may in particular be utilized, when the 1-phase load does not require very high supply voltage.

Further, the electric potential at the neutral node may be constant and may be in particular a ground potential or earth potential and may for example be equal to a potential of a closing or a housing of the arrangement. In particular, the neutral node may then be connected to an end of the pipeline to be heated which is relatively close compared to another end of the pipeline which is to be connected to the phase of the 1-phase power stream which is provided by the connection of the first, the second and the third power source output terminals.

According to an embodiment of the present invention, the first and the second power source output terminal of the 3-phase power source provide synchronized voltages and are connected with each other to provide a phase of the 1-phase power stream and the third power source output terminal of the 3-phase power source provides another phase of the 1-phase power stream.

Thereby, an alternative configuration or switching characteristic is provided in order to generate or provide a 1-phase power stream. Compared to the first alternative described above, a higher voltage of the 1-phase power stream may be achievable, however, a lower current may be achievable. The two alternatives may be selected depending on the characteristic of the 1-phase load which is to be supplied with electric energy.

According to an embodiment of the present invention, the switching section comprises a mechanical and/or semiconductor based switch. The switching section may comprise a mechanical/electromechanical based switch. The switching section may be controlled by a controller which may receive control signals from a topside facility or from other control elements located at the sea ground.

According to an embodiment of the present invention, the arrangement further comprises a control section adapted to provide gate driver signals for the transistors of the converters in the two different modes of operation of the arrangement. The gate driver signals in the two different modes of operation may be different. In particular, the gate driver signal may be such that the voltage at those power source output terminals which are connected to each other are the same and are synchronized (when in the second operational mode). When in the first operational mode, the voltages at the three power source output terminals may be different from each other, in particular different in amplitude and/or phase. However, all voltages at all three power source output terminals may oscillate with a same frequency. In particular, in all modes of operation, the voltages at the three power source output terminals may oscillate with a same frequency.

According to an embodiment of the present invention, the 3-phase power stream provides between 3 kV and 10 kV voltage, in particular 6.6 kV voltage.

Thereby, conventional equipment may be used and typical loads may be appropriately supplied with electric energy.

According to an embodiment of the present invention, a method is provided, for use of the arrangement according to one of the preceding embodiments in a subsea application, in particular in a depth 1000 m to 4000 m below sea level, for alternatively driving a 3-phase load, in particular a variable speed drive, such as a motor, a pump, or a 1-phase load, in particular a direct electrical heating system for heating a pipe.

Thereby, additional supply of a 1-phase power from a topside facility may not be necessary.

It should be understood that features which have been individually or in any combination disclosed, described or mentioned with respect to an arrangement for alternatively providing a 3-phase or a 1-phase power stream may also be applied individually or in any combination to a method of alternatively providing a 3-phase or 1-phase power stream according to an embodiment of the present invention and vice versa.

According to an embodiment of the present invention, a method is provided of alternatively providing a 3-phase or 1-phase power stream, comprising receiving at a first, a second and a third power source output terminal electrical power form a 3-phase power source; selectively providing from the three power source output terminals of the 3-phase power source: a 3-phase power stream at three arrangement output terminals or a 1-phase power stream at two arrangement output terminals, different from the three arrangement output terminals. Further, the power of the three input phases is evenly distributed to provide the 1-phase power stream.

The arrangement may in particular by adapted to selectively switching between connecting at least two power source output terminals of the three power source output terminals with each other; and disconnecting the at least two power source output terminals of the three power source output terminals from each other, wherein the at least two power source output terminals connected with each other provide a phase of the 1-phase power stream.

The illustration in the drawings is in schematic form. It is noted that in different figures, similar or identical elements are provided with the same reference signs or with reference signs, which are different from the corresponding reference signs only within the first digit.

The arrangement 100 for alternatively providing a 3-phase or a 1-phase power stream illustrated in FIG. 1 comprises a 3-phase power source 103 which has a first 105, a second 107 and a third 109 power source output terminal. Further, the arrangement 100 comprises a switching section 111 which is adapted to connect the first, the second and the third power source output terminals 105, 107, 109 with each other to the branch 113 and allow a connection thereto at a terminal 115 to provide a phase of a 1-phase power stream. In the illustration of FIG. 1, the arrangement 100 is in a first operation mode, wherein the switching section 111 is switched such that the first, the second and the third power source output terminals 105, 107, 109 provide a 3-phase power stream to the branches or terminals 117, 119, 121.

In a second operation mode of the arrangement 100 illustrated in FIG. 1, the switching section 111 provides a 1-phase power stream at the terminals 115, 123 by connecting the first, the second and the third power source output terminals 105, 107, 109 to the branch 113 and by connecting the neutral node 125 to the branch connected to the terminal 123. Thereby, four individual switching actions are performed using the switches 127, 129, 131, 133.

The arrangement 100 further comprises another 3-phase power source 135 which provides via a not illustrated connection electric energy to the 3-phase power source 103. The 3-phase power source 103 comprises a first 137, a second 139 and a third 141 converter arrangement which are powered by the other 3-phase power source 135 by not illustrated connections, wherein each of the first, the second and the third converter arrangement 137, 139, 141 has a first converter arrangement output terminal 143, 145, 147, respectively, and a second converter arrangement output terminal 149, 151, and 153, respectively. Thereby, the respective first converter arrangement output terminals 143, 145, and 147 are connected to each other at a neutral node 125. Further, the second converter arrangement output terminals 149, 151, and 153 form or are connected to the first, the second and the third power source output terminals 105, 107, 109, respectively.

Each of the first, the second and the third converter arrangements 137, 139, 141 comprises three 3-phase-to-1-phase converters 155 which are connected in series. The arrangement 100 further comprises a control section 157 which provides via a control line 159 control signals to each of the converters 155, as will be in more detail described below.

As an illustrative example, the 1-phase output terminals 115, 123 of the arrangement 100 are connected to a pipeline 161 for direct electrical heating. In particular, the phase provided at terminal 123 which is connected to the neutral node 125 carries a constant potential and is connected to a side 163 of the pipeline 161 which is closer to the output terminal or the arrangement 100 than a side 165 of the pipeline 161 to which the terminal 115 is connected to which the arrangement 100 supplies an oscillating AC voltage.

The control section 157 is adapted to control the transistors 281 comprised within each of the converters 155 by providing appropriate gate driver signals. In particular, the control section 157 is adapted, when the arrangement 100 is in the first operational mode, to control the transistors 281 such that voltages output at the branches 117, 119, and 121 have the same frequency but different phase. Further, the control section 157 is adapted, when the arrangement 100 is in the second operational state, to control the transistors to have a same frequency and a same phase, in order to avoid unintended current and damages of the components.

As explained above, each of the first, the second and the third converter arrangements 137, 139, 141 comprises several 3-phase-to-1-phase converters 155 which are connected in series. According to an embodiment, each of the first, the second and the third converter arrangements 137, 139, 141 may be connectable (e.g. via the neutral node 125 and an end of the respective converter arrangement) to a associated pipeline segment and each of the first, the second and the third converter arrangements 137, 139, 141 may be operated (independently from each other) with an associated (individual) frequency and/or voltage which are adapted to the respective pipeline segment characterized e.g. by a particular length, resistance, etc. Thereby, several pipeline segments may be heated, in particular using optimized voltage and/or frequency for each individual pipeline segment.

In this case the control section 157 provides via a control line 159 control signals to each of the converters 155 of each of the first, the second and the third converter arrangements 137, 139, 141 individually, to achieve the individual voltage and/or frequency. In this embodiment the converter arrangements 137, 139, 141 are connected in a star like manner each being connected to the neutral node.

Figure 2:
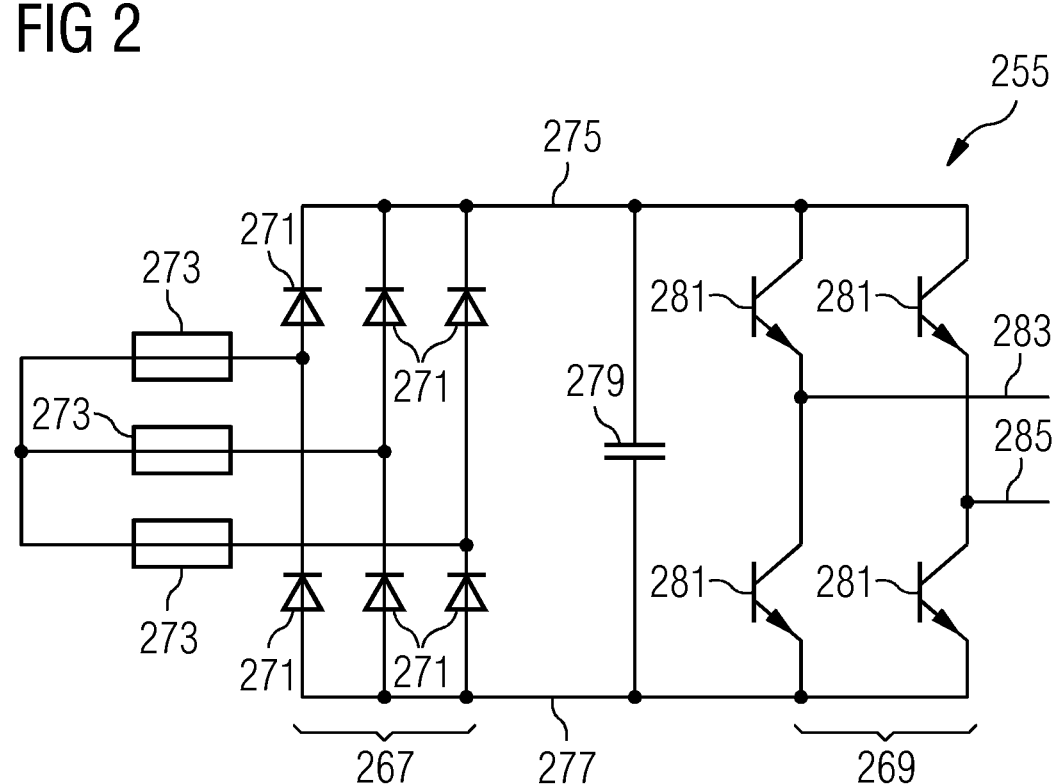
FIG. 2 schematically illustrates a 3-phase to 1-phase converter which is used in a 3-phase power source of an arrangement for alternatively providing a 3-phase or a 1-phase power stream according to an embodiment of the present invention.

FIG. 2 schematically illustrates a 3-phase-to-1-phase converter 255 which may be used as a converter 155 in the arrangement 100 illustrated in FIG. 1 and also may be used as a converter 355 in the arrangement 300 illustrated in FIG. 3 and described below.

The converter 255 is adapted to convert a 3-phase power stream received at an input section 267 to a 1-phase power stream provided at an output section 269. At the input section 267, six diodes 271 are arranged in three strands, wherein each strand comprises two series connected diodes 271. At a midpoint between two diodes in each strand, ends of secondary windings 273 of a not completely illustrated transformer are connected. The transformer comprises a not illustrated primary winding which is inductively coupled to the secondary windings 273. Thereby, a 3-phase power stream is input to the converter 255.

The input section 267 rectifies the AC 3-phase power stream and provides it at DC terminals 275 and 277 between which a capacitor 279 is connected which smoothes the voltage generated by the diodes 271 to filter out some remaining AC components.

The output section 269 comprises four transistors 281 which are arranged in two strands, each having two series connected transistors 281. At midpoints between two transistors in each strand, a first converter output terminal 283 and a second converter output terminal 285 are provided for providing a 1-phase power stream between the converter output terminals 283, 285. For series connection of two or more of the converters 255 illustrated in FIG. 2, a second converter output terminal 285 is connected to a first converter output terminal 283 of the respective adjacent or next converter in the series connected converters, such as the converter arrangements 137, 139, and 141 illustrated in FIG. 1 and the respective converter arrangements 337, 339, and 341 illustrated in FIG. 3.

Figure 3:
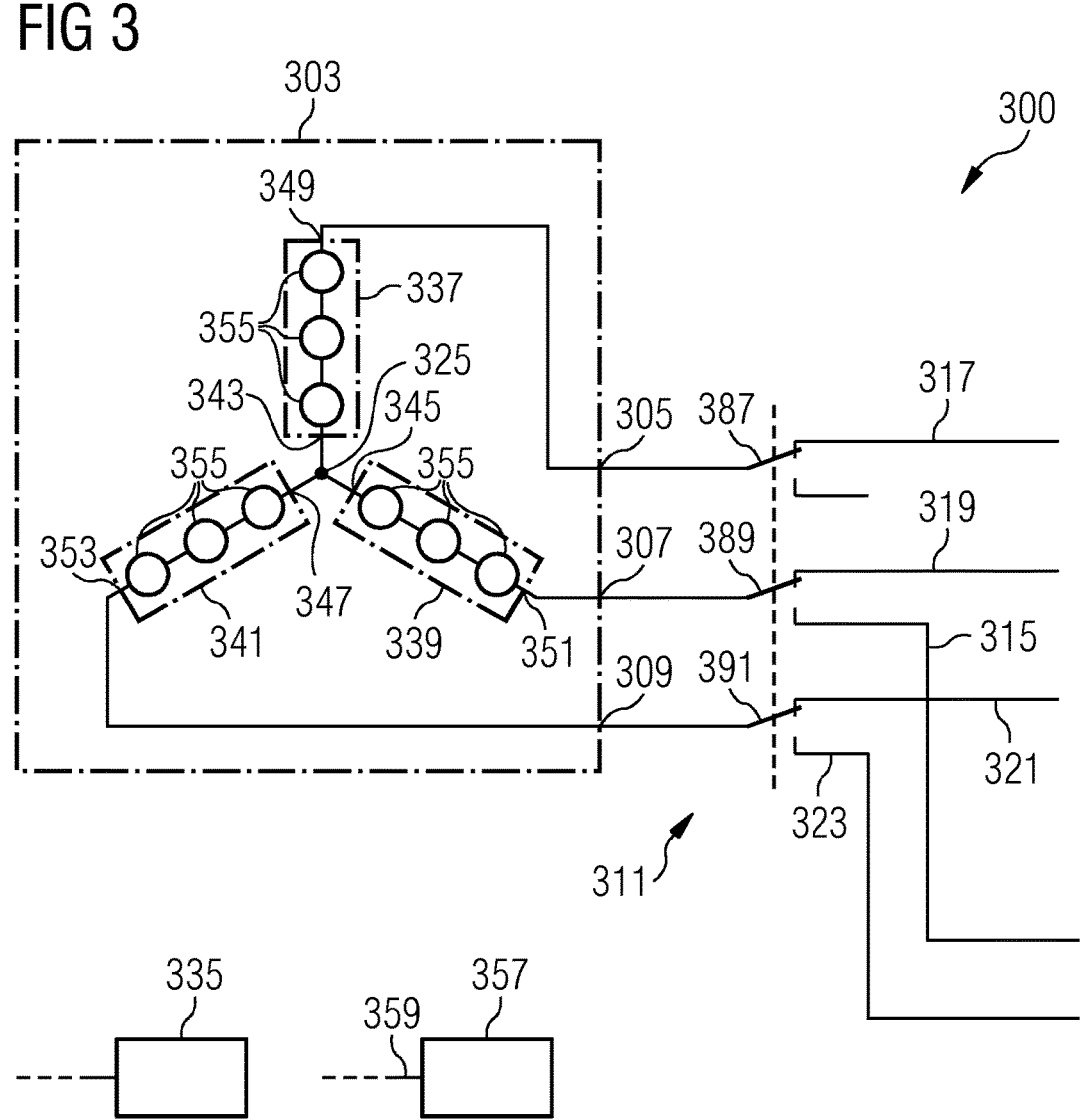
FIG. 3 schematically illustrates an arrangement for alternatively providing a 3-phase or a 1-phase power stream according to an embodiment of the present invention.

FIG. 3 schematically illustrates another arrangement for alternatively providing a 3-phase or a 1-phase power stream 300 according to an embodiment of the present invention. As the arrangement 100 illustrated in FIG. 2, the arrangement 300 comprises a 3-phase power source 303 having a first 305, a second 307 and a third 309 power source output terminal. The 3-phase power source 303 illustrated in FIG. 3 may be similarly or equally constructed as the 3-phase power source 103 illustrated in FIG. 1.

Further, the arrangement 300 comprises a switching section 311 which is however differently constructed than the switching section 111 of the arrangement 100 illustrated in FIG. 1. In particular, the switching section 311 comprises three switches 387, 389, and 391 which may be controlled such as to set the arrangement 300 in a first operation mode where a 3-phase power stream is provided at branches or terminals 317, 319, 321 (or arrangement output terminals) or in a second operational mode, where a 1-phase power stream is provided at terminals 315, 323.

In FIG. 3, the first operational state is illustrated, wherein the three third power source output terminals 305, 307, 309 are connected to the branches 317, 319, and 321, respectively. To adopt the second operational state, the switches 389, 391 would be switched such as to connect the second power source output terminal 307 to the terminal 315 and to connect the third power source output terminal 309 to the terminal 323. The output terminals 315, 323 may for example be used for supply electric energy to a direct electrical heating system and the 3-phase output terminals 317, 319, 321 may for example be utilized for supplying electric energy to a pump or a motor.

The control section 357 illustrated in FIG. 3 is adapted, when the arrangement 300 is in the second operational state or mode, to control the transistors 281 comprised in each of the converters 355 such that the voltage provided at the power source output terminals 307, 309 to be different in phase and equal in frequency and also equal in amplitude.

The converter 255, 155, 355 may also be denoted as a power cell.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The above explanation of the embodiments describes the present invention exclusively within the scope of examples. Of course, individual features of the embodiments can be freely combined with one another, if technically feasible, without departing from the scope of the present invention.

The invention claimed is:

1. An arrangement for alternatively providing a 3-phase or a 1-phase power stream, comprising:
   a 3-phase power source including a first, a second and a third power source output terminal; and
   a switching section configured to switch between provision for the 3-phase and the 1-phase power stream, wherein the 3-phase power stream is provided, from the first, second and third power source output terminals of the 3-phase power source, at three arrangement output terminals;

wherein the 1-phase power stream is provided, from the first, second and third power source output terminals of the 3-phase power source, at two arrangement output terminals, different from the three arrangement output terminals, wherein power of three input phases is evenly distributed to provide the 1-phase power stream, wherein the first, the second and the third power source output terminals of the 3-phase power source are configured to provide synchronized voltages and are configured to be connected with each other to provide a first connection terminal of the 1-phase power stream, and wherein a neutral node is configured to provide a second connection terminal of the 1-phase power stream.

2. The arrangement of claim 1, wherein the switching section is adapted to selectively perform one of:
connecting at least two power source output terminals of the first, second and third power source output terminals with each other and allow a connection thereto; and
disconnecting the at least two power source output terminals of the first, second and third power source output terminals from each other,
wherein the at least two power source output terminals connected with each other provide the first connection terminal of the 1-phase power stream.

3. The arrangement of claim 2, wherein the second connection terminal of the 1-phase power stream is provided by one of:
the power source output terminal of the first, second and third power source output terminals which is not directly connected with the at least two power source output terminals connected with each other; and
the neutral node including a constant electrical potential and allowing a connection thereto.

4. The arrangement of claim 2, wherein the switching section comprises at least one of a mechanical and semiconductor based switch.

5. The arrangement of claim 2, further comprising:
a control section, adapted to provide gate driver signals for transistors of converters in two different modes of operation.

6. The arrangement of claim 2, wherein the 3-phase power stream provides between 3 kV and 10 kV voltage.

7. The arrangement of claim 1,
wherein the three arrangement output terminals for the 3-phase power stream correspond to the first, second and third power source output terminals of the 3-phase power source and
wherein the two arrangement output terminals for the 1-phase power stream correspond to the two of the first, second and third power source output terminals of the 3-phase power source.

8. The arrangement of claim 1,
wherein the 3-phase power source comprises:
a first, a second and a third converter arrangement, being powered by another 3-phase power source, each including a first and a second converter arrangement output terminal,
wherein the first converter arrangement output terminals of the three converter arrangements are connected to each other at the neutral node, wherein the second converter arrangement output terminal of the first converter arrangement forms the first power source output terminal, wherein the second converter arrangement output terminal of the second converter arrangement forms the second power source output terminal, and wherein the second converter arrangement output terminal of the third converter arrangement forms the third power source output terminal.

9. The arrangement of claim 8, wherein the at least one of the first, the second and the third converter arrangement comprises at least two 3-phase to 1-phase converters, series connected at their 1-phase output terminals.

10. The arrangement of claim 8, wherein the other 3-phase power source comprises at least three secondary windings of a transformer.

11. The arrangement of claim 9, wherein at least one 3-phase to 1-phase converter comprises:
an input section with six diodes to rectify a 3-phase power stream;
a capacitor to smooth the rectified power stream; and
an output section comprising four power transistors to provide an 1-phase output stream,
wherein transistors of the output section of the 3-phase to 1-phase converter are controlled to adopt a non-conducting state.

12. The arrangement of claim 11, wherein, during switching between a 3-phase and 1-phase power stream, transistors of the output section of the 3-phase to 1-phase converter are controlled to adopt a non-conducting state.

13. The arrangement of claim 9, wherein the at least one of the first, the second and the third converter arrangement comprises 3 to 30 3-phase to 1-phase converters, series connected at their 1-phase output terminals.

14. The arrangement of claim 9, wherein the at least one of the first, the second and the third converter arrangement comprises 6 to 8 3-phase to 1-phase converters, series connected at their 1-phase output terminals.

15. The arrangement of claim 1, wherein the switching section comprises at least one of a mechanical and semiconductor based switch.

16. The arrangement of claim 1, further comprising:
a control section, adapted to provide gate driver signals for transistors of converters in two different modes of operation.

17. The arrangement of claim 1, wherein the 3-phase power stream provides between 3 kV and 10 kV voltage.

18. A method, comprising:
using the arrangement of claim 1 in a subsea application, for alternatively driving
a 3-phase load, or
a 1-phase load.

19. The method of claim 18, wherein the arrangement is used in a subsea application in a depth 1000 m to 4000 m below sea level, wherein the 3-phase load is a variable speed drive, and wherein the 1-phase load is a direct electrical heating system for heating a pipe.

20. A method of alternatively providing a 3-phase or 1-phase power stream, comprising:
receiving at a first, a second and a third power source output terminal electrical power from a 3-phase power source; and
selectively switching between provision of the 3-phase power stream and the 1-phase power stream from the first, the second and the third power source output terminals of the 3-phase power source wherein the 3-phase power stream is provided at three arrangement output terminals, wherein the 1-phase power stream is provided at two arrangement output terminals, different from the three arrangement output terminals, wherein power of the three input phases is evenly distributed to provide the 1-phase power stream, wherein the first, the second and the third power source output terminals of the 3-phase power source are configured to provide synchronized voltages and are configured to be connected with each other to provide a first connection terminal of the 1-phase power stream, and wherein a neutral node is configured to provide a second connection terminal of the 1-phase power stream.

* * * * *